Figure 1:
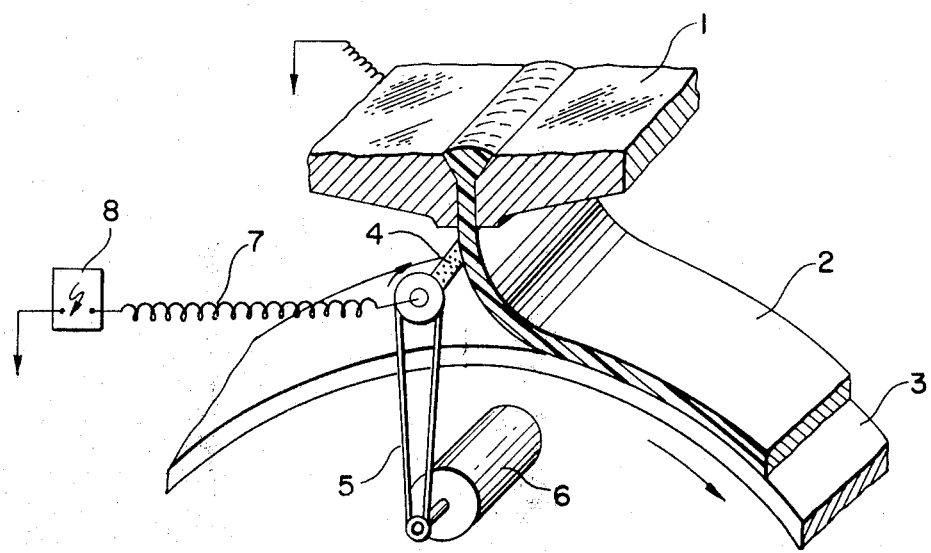

United States Patent [19]

Sauer et al.

[11] 3,898,026
[45] Aug. 5, 1975

[54] APPARATUS FOR RANDOMIZING THICKER AND THINNER AREAS IN THE PRODUCTION OF FILM WEBS

[75] Inventors: Christian Sauer, Uulich; Peter Schwägler, Mainz; Norbert Roth, Ingelheim; Manfred Unger, Georgenborn; Günter Haas, Wiesbaden-Biebrich, all of Germany

[73] Assignee: Hoechst Aktiengesellschaft, Germany

[22] Filed: July 25, 1973

[21] Appl. No.: 382,539

Related U.S. Application Data
[62] Division of Ser. No. 286,919, Sept. 7, 1972.

[52] U.S. Cl. ............ 425/174.8 E; 264/24; 425/377; 425/404; 425/455
[51] Int. Cl. .............................................. B29d 7/22
[58] Field of Search ............ 425/174.8 E, 326, 377, 425/404, 446, 455; 264/22, 24, 216, 212; 317/262 A, 262 E

[56] References Cited
UNITED STATES PATENTS

| | | | |
|---|---|---|---|
| 875,026 | 6/1970 | Scharf | 317/262 A X |
| 3,233,156 | 2/1966 | Jarvis et al. | 317/262 A |
| 3,247,430 | 4/1966 | Streiffert | 317/262 A |
| 3,520,959 | 7/1970 | Busby | 425/174.8 E X |
| 3,597,515 | 8/1971 | Widiger | 264/216 |
| 3,686,374 | 8/1972 | Hawkins | 425/174.8 E X |
| 3,709,964 | 1/1973 | De Geest et al. | 264/216 X |

*Primary Examiner*—R. Spencer Annear
*Assistant Examiner*—Mark Rosenbaum
*Attorney, Agent, or Firm*—James E. Bryan

[57] ABSTRACT

This invention relates to an apparatus for the production of a web of film material, wherein as the molten film material leaves the die it is given an electrostatic charge, the electrostatic charge distribution across the width of the molten film and/or the electrostatic charge density being varied with time.

5 Claims, 6 Drawing Figures

APPARATUS FOR RANDOMIZING THICKER AND THINNER AREAS IN THE PRODUCTION OF FILM WEBS

This is a division of application Ser. No. 286,919, filed Sept. 7, 1972.

The invention relates to the production of webs of film materials, especially thermoplastic materials.

In the manufacture of webs of film materials, and especially thermoplastic materials, it is not possible to achieve uniform thickness of the film over the entire width of the web. The film always contains numerous juxtaposed narrow zones which are thicker or thinner than the mean for the film. These zones of differing thickness extend in striations in the longitudinal direction of the web of film, and retain their positions during manufacture over a lengthy period. These striated thick or thin areas, which will hereinafter be referred to as striations for the sake of simplicity, can stem from various causes, such as differences in the viscosity or temperature of the extruded melt, slight roughness on the surface of the die or differences in wetting when the melt passes out of the die. In the case of thermoplastic films which are stretched longitudinally or biaxially, the striations also may occur as the result of uneven stretching. Since these striations of differing thickness retain their position in the web of film material, the differences are superimposed upon each other when the web is wound into a roll. Thus, annular bulges resulting from thick areas, and annular grooves resulting from thin areas are formed on the roll. These bulges and the grooves lead to very disadvantageous permanent raised and deformed areas on the film. Furthermore, they have a deleterious effect during the further processing of the film, e.g. during its metallization or coating, or when it is used in packaging machines.

For this reason, considerable effort has been made to find a method of controlling the cross-section of the webs during their manufacture. However, as explained above, there are many different causes for the striations and considerable technical difficulties arise in counteracting them during production. Thus for example, efforts have been made so to influence the inherently constant cross-section of the web that the zones where the changes in thickness occur change their positions with time. In this way, the additive effect of the changes in thickness when the web is wound into a roll is avoided, and a roll is obtained from which the disadvantageous raised areas in the film are absent. This has been achieved by varying the traversing movement during winding-on of the web but although this method leads to an improved roll of film, it does not completely overcome the problem because the thick and thin zones can be displaced only by a few centimeters over the width of the web and it can be used only on a limited basis because of the technical complications involved in traversing, especially in the case of wide webs of film material.

Another method consists in producing an additional thick zone on the film and in causing this to extend periodically over the width of the web; this thick zone acts as a spacing means during winding. However, a disadvantage of this arrangement is that the dimensions across the web are intentionally altered at individual points, and additional consumption of material has to be accepted.

Other methods involve varying the stretching effect in the longitudinal and transverse directions so as to create artificial thickened areas, and here again the thickness of the film is intentionally altered to a considerable extent at individual points.

All these previously used methods lead to improvement in the build-up of the roll of material only when the artifically produced discrete thickened areas lie close to each other, i.e., when only small gaps separate them. Since these thick zones are usually very pronounced, they result in an obvious and undesirable spoilage of the cross-section of the film. Furthermore, the shifting of the thick areas over the width of the web has to be achieved at high frequency at the high production speeds that are desired, and this has left some unsolved technical problems.

There has accordingly remained a need for a method in which the cross-section of the web of film material can be so varied during production that when the film is wound to form a roll, no raised or deformed zones occur in the roll, while at the same time the cross-section of the film material is only slightly altered, if at all.

The present invention provides a method for the production of a web of film material wherein as the molten film material leaves the die it is given an electrostatic charge, the electrostatic charge distribution across the width of the molten film and/or the electrostatic charge density being varied with time.

The present invention also provides apparatus for the production of webs of film material comprising an extruder die, a cooling surface arranged beneath the die, means for applying an electrostatic charge to the molten film as it leaves the extruder die and for varying the electrostatic charge distribution across the width of the molten film and/or the electrostatic charge density with time.

In the preferred form of production of the web according to the present invention a melt of thermoplastic material is extruded from a die, is continuously pulled out of the extruder and is then cooled to form a web of film material, the melt being electrostatically charged immediately as it leaves the die to give the surface of the molten film a microscopically irregular yet macroscopically statistical charge distribution. This results both in the melt being applied to the cooling surface (e.g. of a cooling roller) under different conditions and in its differential wetting at the die, so that statistical fluctuations in thickness are produced in the film material.

Without in any way wishing to restrict the scope of the present invention, it is believed that the reason for this surprising effect probably lies in a Coulombic reciprocal action with the electrically grounded die, the charges delivered applying a force to the melt in the direction of the electrical flux lines extending towards the die.

A change in the timing of the charge distribution and/or in the density of the charge naturally also leads to changes in the wetting of the melt at the die and in the way in which the melt is applied to the cooling surface so that the method thus can be varied as regards the statistical fluctuations in thickness.

In many cases it will suffice to apply the differing charges, transversely of the direction of travel of the material, to only parts of the melt, but it has proved especially advantageous in practice to apply an uneven charge distribution to the entire width of the melt.

In practice, the charges are usually produced in air, but if desired or necessary (e.g. when oxygen would have an undesirable effect upon the surface of the hot melt) they may be produced in a gas atmosphere which contains no oxygen or only very small quantities thereof.

The charges are generated by way of electrodes described in more detail below, which can be connected to commercially available high-voltage generators; both DC voltage and AC voltage can be used.

Preferably, wire electrodes are used which have irregular surfaces and by means of which uneven charges can be produced. A change in the position of the irregular portions of the electrodes in relation to the film of molten material results in a corresponding change in the distribution of the charge on the material, and thus in a change in the wetting of the die.

By also continuously or intermittently displacing or rotating the wire electrode, it is possible to influence the thickness of the film in a simple and efficient manner.

A further possible way of producing, as required, changes in the charging of the surface of the melt and thus statistical unevenness in the thickness of the web of film material, is that of varying the high voltage with time. Such a variation can be achieved in a simple manner, e.g. by superimposing a variable voltage function upon the given constant high voltage.

It should be stressed that the electrodes used for the purposes of the present invention have nothing in common with the wire electrodes that are frequently used for imparting a uniform, non-varying electrostatic charge to the melt, after it emerges from the extrusion die, to facilitate its application to the cooled roller in a rapid manner and to prevent the formation of blisters. However, a wire electrode of the latter sort can, of course, also be used in combination with the electrode used for influencing the cross-section of the film in accordance with the present invention.

Care should be taken to fit the electrode having the irregular surface as near as possible to the outlet orifice through which the melt is extruded from the die. The electrode is preferably fitted rearwardly of the freshly extruded film of fused material, although the cross-section of the film also can be influenced by locating the electrode forwardly of the film. The expressions "forwardly of" and "rearwardly of," as used herein, relate to the direction in which the melt is pulled from the extruder.

By the method of the present invention it is possible to influence the cross-section of the film over only part of its length. Preferably however, the cross-section is altered over its entire width by using an electrode of sufficient length.

A potential applied to the electrode may be negative but is preferably positive in relation to ground. The level of the high voltage supplied should be at least high enough to cause ionization of the gas molecules in the zone surrounding the electrode.

A normal high voltage supply unit can be used and suitable voltages range between 100 volts and the breakdown voltage, preferably between 4,000 and 20,000 volts. The diameter of the electrode, which is preferably an electrically conductive wire, rod or tube, generally lies between 0.01 mm and 20 mm.

The method of the present invention is applicable to all thermoplastic dielectric films capable of being extruded through a die. It is especially suitable for use in producing films of polyesters, e.g. polyethylene terephthalate, and polyolefins, e.g. polypropylene and polyethylene.

The films produced can be subjected to further processing. In particular, better results are obtained with uniaxially or biaxially stretched films, which can also be heat-stabilized.

Figure 2:
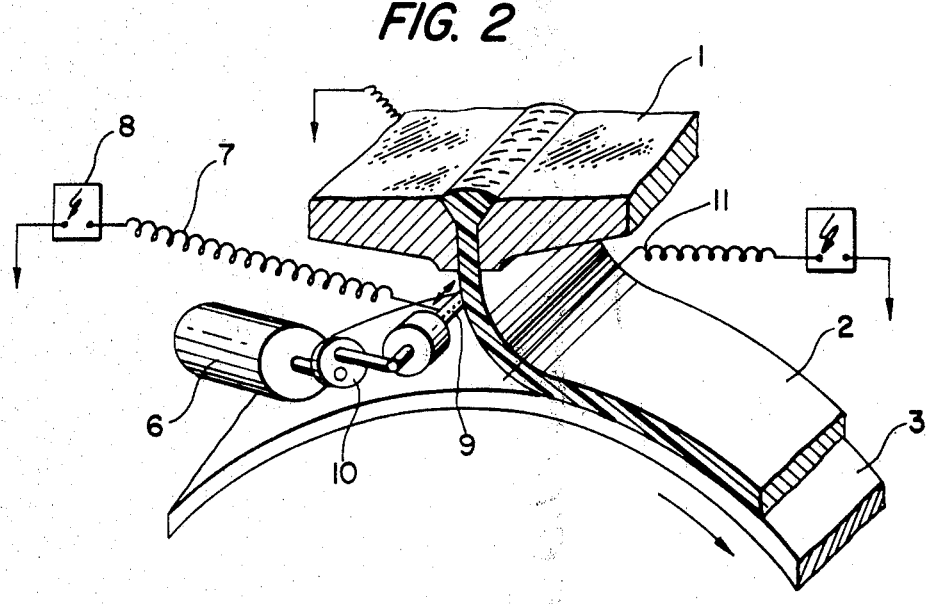
Figure 3:
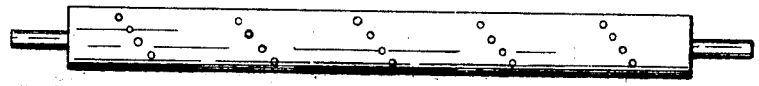
Figure 4:
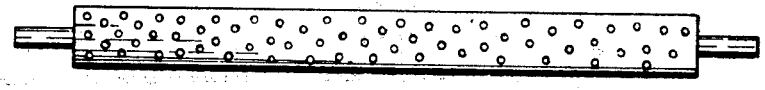
Figure 5:
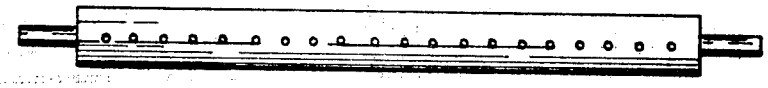

The present invention now will be described in greater detail, by way of example only, with reference to the accompany drawings, in which:

FIG. 1 is a side view, partly in cross-section, of one form of apparatus according to the present invention;

FIG. 2 shows another form of apparatus according to the present invention, in combination with an additional arrangement comprising a known wire electrode for electrostatically applying the film of fused material to a cooled roller; and FIGS. 3 to 6 show suitable forms of electrode for carrying out the method of the present invention, which electrode can be caused to rotate about its longitudinal axis with the aid of the apparatus shown in FIG. 1, or can be moved transversely to the direction of extrusion by means of the apparatus illustrated in FIG. 2.

FIG. 1 illustrates, partly in cross-section, one form of apparatus that can be suitably used for performing the method according to the present invention. A melt 2 of thermoplastic material is extruded from a die 1 and is caused to solidify by means of a rotating cooling roller 3. Rearwardly of the film 2, as related to the direction of rotation of the cooling roller 3, there is fitted a wire or rod electrode 4 having an irregular surface and extending transversely of the path along which the film travels. In the arrangement illustrated, the irregularity of the electrode surface is constituted by a large number of points disposed along helical lines on the electrode. The electrode 4 is caused to rotate slowly, preferably at a few revolutions per minute, by the motor 6 with the aid of a belt transmission 5. Through the lead wire 7, the high voltage supply unit 8 applies to the electrode 4 a potential which is preferably positive in relation to ground, and the magnitude of which enables the gas molecules surrounding the electrode to be ionized.

FIG. 2 shows a further arrangement in accordance with the invention. The electrode 9 having points on its surface is caused to reciprocate intermittently transversely of the web of film by an eccentric disc 10 driven by the motor 6. Additionally, a wire electrode 11, known per se, is fitted near the front face of the film and extends transversely of the path along which the film travels, this electrode facilitating the rapid application of the film to the cooling roller.

Although it is preferred to fit the electrode, as illustrated in FIGS. 1 and 2, rearwardly of the melt, it may be arranged forwardly of the melt.

Of considerably importance is the fact that the method illustrated in FIG. 2 which uses the known electrode for applying the film to the cooling roll results in the provision of films at the pull-off that are completely different from those produced by means only of the known electrostatic method of applying the film to the cooling surface. Whereas in the latter known method the surface of the fused material is charged in a uniform manner for the purpose of dealing with a problem that requires this, in the method of the present invention the surface of the fused material is deliberately charged in a non-uniform manner.

FIGS. 3 to 6 show various forms of electrodes suitable for use in the present invention. The electrodes are made of electrically conductive wires, rods or tubes which are either provided with an irregular array of electrically conducting points, or around which a further wire is coiled FIG. 6). The points can be created for example by inserting small metallic heads, by filing, by sandblasting, or by depositing spots of welding material as in electric welding. It is likewise possible to cover a thin wire electrode with a dielectric layer perforated at individual points so that gas-ionization can take place at these uncovered points on the electrode. A further suitable arrangement consists of a plurality of electrically conductive needle electrodes which are positioned transversely of the path of travel of the film. In this connection, the only factor important to the method of the invention is that the electrode used should provide an uneven charge distribution across the film.

The purpose achieved by the present invention is the alteration of the thickness of a film of thermoplastic material with time in such a way that the film can be formed into a roll containing no raised areas. For this purpose it is particularly advantageous if the changes in thickness are achieved in a predetermined yet randomized or statistical manner. The method of the invention offers this possibility to a very wide extent, in that for example the speed of the drive motor 6, shown in FIGS. 1 and 2, can be continuously varied and/or the magnitude of the potential applied to the electrode can be altered. Both of these ends can be achieved by simple existing means.

One or both of the electrodes can be fitted in a gas-filled chamber, and this improves the effect when the apparatus operates at high speeds. Furthermore a suitable gas, e.g. air or an inert gas, or gas mixture can be blown into the zone surrounding one or both electrodes in order to increase the number of charge carriers transferred to the film during each unit of time.

The following Example further illustrates the invention.

EXAMPLE

A melt of polyethylene terephthalate was extruded from a 480 mm-wide flat-slot die and applied electrostatically in known manner to a rotating cooling drum with the aid of a wire electrode. The film had a thickness of 140 $\mu$, and the deviations from the required thickness in the transverse direction amount to $\pm 5 \mu$ on average. In each case many thousands of meters of the manufactured film were measured in the transverse direction, and it was found that the thick zones were practically in register, as were the thin zones, i.e., apart from extremely small lateral displacements, they were superimposed upon each other. A roll of the film exhibited the well-known "piston rings."

The film was then stretched biaxially to give an extension of between 1 : 2 to 1 : 5 and to form a film having a thickness of approximately 12 $\mu$ and a width of 1,260 mm. The deviations in the transverse direction from the nominal thickness in the stretched film were between approximately $\pm 0.6 \mu$ to $\pm 0.4 \mu$. The thickness of the film across the web was measured at intervals of 100 meters on a total length of web of 2,500 meters. The individual thickened and reduced portions were practically in register with each other, i.e., the thick and thin zones retained their positions on the web of film material even during the stretching operation.

Figure 6:

Thereafter, the same apparatus was used and operated under the same conditions, but with the difference that in addition to the electrode used for applying the film to the cooling roll, a rotating electrode of the form illustrated in FIG. 6 was fitted rearwardly of the melt. The diameter of the carrier wire was 0.3 mm, and that of the wire wound around the carrier was 0.1 mm.

The electrode was fitted vertically below the outlet orifice of the die at a distance of 10 mm from the die. The distance of the electrode from the cooling roll was 15 mm. A positive D.C. voltage of 8,500 volts was applied to the electrode and a discharge current of 0.45 mA was held. The electrode was rotated at a speed of four revolutions per minute. Thickness measurements were again made over the width of the initial film and the biaxially stretched film at intervals of 100 meters in the lengthwise direction. Variations in thickness of from $\pm 0.6 \mu$ to $\pm 0.5 \mu$, measured in the transverse direction, were recorded and the zones of increased and reduced thickness respectively were no longer in register at all. Instead, all the individual measurements across the film differed from each other in a statistical manner. When the film was coiled to form a roll, "piston rings" could no longer be observed, and even after storage over a fairly lengthy period, the films produced in accordance with the present invention no longer exhibited raised or deformed areas.

It will be obvious to those skilled in the art that many modifications may be made within the scope of the present invention without departing from the spirit thereof, and the invention includes all such modifications.

What is claimed is:

1. Apparatus for randomizing thicker and thinner areas in the production of a web of film material comprising extruder die means, a cooling surface arranged beneath said die means, randomizing electrode means positioned between said die means and said cooling surface, said electrode means being positioned behind a molten film issued from said die means and being adapted to apply a variable electrostatic charge to said molten film so that the electrostatic charge distribution across the width of the film is varied, and means for moving said randomizing electrode means.

2. Apparatus according to claim 1 in which the means for moving the electrode comprises means for rotating the electrode.

3. Apparatus according to claim 1 in which the means for moving the electrode comprises means for moving the electrode across the width of the film.

4. Apparatus according to claim 3 in which the means for moving the electrode comprises means for reciprocating the electrode across the width of the film.

5. Apparatus according to claim 1 in which the randomizing electrode has an outer dielectric layer perforated at various points.

* * * * *

UNITED STATES PATENT OFFICE
CERTIFICATE OF CORRECTION

PATENT NO. : 3,898,026
DATED : August 5, 1975
INVENTOR(S) : Christian Sauer et al It is certified that error appears in the above-identified patent and that said Letters Patent are hereby corrected as shown below:

Item [30] should read:

- - - Foreign Application Priority Data
September 9, 1971   Germany . . . . . 2145080   - - -.

Item [75] "Uulich" should read - - - Julich - - -.

Column 5, line 8, "FIG. 6)." should read - - - (FIG. 6). - - -

Signed and Sealed this twenty-eight Day of October 1975

[SEAL]

Attest:

RUTH C. MASON
Attesting Officer

C. MARSHALL DANN
Commissioner of Patents and Trademarks